（12) United States Patent
Mau et al.

(10) Patent No.: US 10,666,765 B2
(45) Date of Patent: May 26, 2020

(54) METHODS, SYSTEMS, AND COMPUTER PROGRAM PRODUCT FOR PROVIDING GRAPHICAL CROSS CONNECTIVITY AND DYNAMIC CONFIGURABILITY

(71) Applicant: CUSTOM MICROWAVE COMPONENTS, INC., Fremont, CA (US)

(72) Inventors: Gregory S. F. Mau, Fremont, CA (US); Jeremy Oliver Korn, Aptos, CA (US)

(73) Assignee: Custom Microwave Components, Inc., Fremont, CA (US)

( * ) Notice: Subject to any disclaimer, the term of this patent is extended or adjusted under 35 U.S.C. 154(b) by 210 days.

(21) Appl. No.: 15/446,928

(22) Filed: Mar. 1, 2017

(65) Prior Publication Data

US 2017/0180510 A1   Jun. 22, 2017

Related U.S. Application Data

(63) Continuation of application No. 13/889,157, filed on May 7, 2013, now Pat. No. 9,602,359.
(Continued)

(51) Int. Cl.
*G06F 3/048* (2013.01)
*H04L 29/08* (2006.01)
(Continued)

(52) U.S. Cl.
CPC .......... *H04L 67/34* (2013.01); *H04L 41/0803* (2013.01); *H04L 41/22* (2013.01); *H04L 67/42* (2013.01)

(58) Field of Classification Search
CPC .............................. G06F 3/0481; H04L 41/22
See application file for complete search history.

(56) References Cited

U.S. PATENT DOCUMENTS 6,519,540 B1 *   2/2003  Salandro ................ H04H 60/04
                                                    345/55
6,664,985 B1    12/2003  Bormann et al.
(Continued)

FOREIGN PATENT DOCUMENTS

WO      WO 97/19543 A1    5/1997

OTHER PUBLICATIONS

Search Report dated Sep. 3, 2014 for related United Kingdom Patent Application No. GB 1404411.9, 1 page.
(Continued)

*Primary Examiner* — Matthew Ell
(74) *Attorney, Agent, or Firm* — Vista IP Law Group, LLP

(57) ABSTRACT

Disclosed are methods, systems, and articles of manufactures for graphical cross connectivity and dynamic configurability for interconnection between inputs and outputs of a device. Various implementations identify instructions from a user interface to graphically display various view modes that include a global view mode showing all active connections between inputs and outputs or one or more program modes showing all active connections for identified input(s) or identified output(s). Some implementations also provide user interface functions to dynamically query, control, or configure the device and the connectivity between the inputs and the outputs based at least in part upon various view modes of the connectivity of the device.

20 Claims, 15 Drawing Sheets

Related U.S. Application Data

(60) Provisional application No. 61/800,133, filed on Mar. 15, 2013.

(51) Int. Cl.
*H04L 12/24* (2006.01)
*H04L 29/06* (2006.01)

(56) References Cited

U.S. PATENT DOCUMENTS

| | | | |
|---|---|---|---|
| 6,769,046 | B2 | 7/2004 | Adams et al. |
| 7,257,641 | B1* | 8/2007 | VanBuskirk ........ H04L 12/1822 709/223 |
| 2004/0196309 | A1* | 10/2004 | Hawkins ................. H04L 41/22 715/738 |
| 2008/0005675 | A1* | 1/2008 | Alderson ................. H04L 41/22 715/734 |
| 2012/0003982 | A1 | 1/2012 | Natarajan et al. |
| 2014/0313935 | A1* | 10/2014 | Koziy ................... H04M 3/244 370/254 |

OTHER PUBLICATIONS

Non-final Office Action dated May 14, 2015 for related U.S. Appl. No. 13/889,157, 17 pages.
Final Office Action dated Sep. 18, 2015 for related U.S. Appl. No. 13/889,157, 17 pages.
Non-final Office Action dated Jan. 14, 2016 for related U.S. Appl. No. 13/889,157, 19 pages.
Final Office Action dated Jul. 15, 2016 for related U.S. Appl. No. 13/889,157, 22 pages.
Notice of Allowance and Fee(s) due dated Nov. 4, 2016 for related U.S. Appl. No. 13/889,157, 7 pages.
Foreign Office Action dated Mar. 11, 2020 for related United Kingdom Patent Application No. GB 1404411.9, 5 pages.

* cited by examiner

METHODS, SYSTEMS, AND COMPUTER PROGRAM PRODUCT FOR PROVIDING GRAPHICAL CROSS CONNECTIVITY AND DYNAMIC CONFIGURABILITY

CROSS REFERENCE TO RELATED APPLICATION

This application is a continuation of U.S. patent application Ser. No. 13/889,157, now U.S. Pat. No. 9,602,359, entitled "METHODS, SYSTEMS, AND COMPUTER PROGRAM PRODUCT FOR PROVIDING GRAPHICAL CROSS CONNECTIVITY AND DYNAMIC CONFIGURABILITY" and filed on May 7, 2013 that claims the benefit of U.S. Prov. Pat. App. Ser. No. 61/800,133, entitled "METHODS, SYSTEMS, AND COMPUTER PROGRAM PRODUCT FOR PROVIDING GRAPHICAL CROSS CONNECTIVITY AND DYNAMIC CONFIGURABILITY FOR A SWITCH MATRIX" filed on Mar. 15, 2013. The contents of the aforementioned U.S. Patent Application and U.S. Provisional Patent Application are hereby expressly incorporated by reference in their entireties for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

An RF (radio frequency) or microwave switch matrix (hereinafter a switch matrix) constitutes an integrated system of electronic components to route RF or microwave signals between multiple inputs and multiple outputs. Such switch matrices are often used in test systems to characterize device under test (DUT), signal broadcasting (e.g., satellite signals or cable signals), etc. Nonetheless, conventional switch matrices often rely on complex or tedious query processes or multiple network round-trips to configure a switch matrix. Some conventional approaches even rely on the trial-and-error approach to connect an input to an output. What is therefore needed is a method, a system, and a computer program product for providing graphical cross connectivity and dynamic configurability for a switch matrix.

SUMMARY

Disclosed are methods, systems, and articles of manufactures for providing graphical cross connectivity and dynamic configurability for cross connecting multiple inputs and multiple outputs. In some embodiments, the methods provide graphical cross connectivity and dynamic configurability for interconnection between multiple inputs and multiple outputs using a switch matrix. Depending upon the context in which the term "connectivity" is used, connectivity may include the state, quality, extent, information, or capacity of interconnection between at least one of multiple inputs and at least one output of multiple outputs of one or more devices, one or more systems, one or more applications, or combinations thereof (hereinafter device) in various embodiments described herein.

In some embodiments, the one or more devices, one or more systems, one or more applications, or combinations thereof may include a switch matrix, a device for switching signals, or a software emulator or simulator that emulates or simulates the signal flow in a software program. It shall be noted that the term "interconnection" and the term "connection" are used interchangeably throughout this application, unless otherwise recited or claimed. It shall be noted that several exemplary embodiments or exemplary implementations described below recite a switch matrix. Nonetheless, various embodiments described herein apply with full, equal effects to connect at least one input of multiple inputs and at least one output of multiple outputs and are not intended to limit the scope of claims or the scope of various embodiments to one or more switch matrices.

Various embodiments identify instructions from a graphical cross connect interface to graphically display various view modes that include at least a global view mode showing all active connections between multiple inputs and multiple outputs or one or more program modes showing all active connections for one or more identified inputs or one or more identified outputs. In some embodiments, the various view modes include one or more program mode such as an input program mode or an output program mode. In some embodiments, a global view mode may be overlaid with a program mode such as an input program mode or an output program mode. In some embodiments, a global view mode Some embodiments further provide a graphical representation of all possible connections between multiple inputs and multiple outputs, where the graphical representation of all possible connections may be turned off or overlaid with any other view modes (e.g., input program mode, output program mode, and global view mode). In some embodiments, the cross connect graphical interface illustrates these possible connections between the multiple inputs and the multiple outputs in a graphical cross interconnecting pattern (e.g., a graphical fan-in or a graphical fan-out pattern) for each of the multiple inputs or for each of the multiple outputs such as what is shown in FIGS. 9-14. It shall be noted that the fan-in or the fan-out pattern for an input or an output is shown with a collection of straight lines between inputs and outputs. Nonetheless, it shall be noted that the cross interconnecting pattern is not intended the scope of the claims or the scope of other embodiments to such cross interconnecting patters with collections of straight lines, unless otherwise specifically recited or claimed. Some implementations provide user interface functions to dynamically query, control, or configure the switch matrix or any device comprising multiple inputs and multiple outputs and the connectivity between the inputs and the outputs based at least in part upon various view modes of the connectivity of the switch matrix or any device comprising multiple inputs and multiple outputs.

Various embodiments are directed at a computer implemented method for providing graphical cross connectivity and dynamic configurability for interconnection between multiple inputs and multiple outputs and comprises at least the act of using a computing device having at least one processor to perform a process. The process in the computer implemented method in these embodiments further comprises the act of identifying one or more instructions from a graphical cross connectivity interface to configure connectivity between multiple inputs and multiple outputs, the act of identifying or configuring the connectivity between the multiple inputs and the multiple outputs in response to the one or more instructions, and the act of displaying the connectivity, which has been identified or configured, in the graphical cross connectivity interface.

In some embodiments, the act of identifying the one or more instructions from the graphical cross connectivity interface to configure the switch matrix comprises at least one of identifying one or more first instruction from the graphical cross connectivity interface to configure the switch matrix, identifying one or more second instruction from the graphical cross connectivity interface to display an input focus view mode for the switch matrix, identifying one or more third instruction from the graphical cross connectivity interface to display an output focus view mode for the switch matrix, and identifying one or more third instruction from the graphical cross connectivity interface to display a global view mode for the switch matrix.

In some embodiments, the act or process of identifying or configuring the connectivity between the multiple inputs and the multiple outputs in response to the one or more instructions comprises at least one of configuring one or more inputs or one or more outputs in response to one or more first instructions, identifying the connectivity for an input of the multiple inputs in response to one or more second instructions, identifying the connectivity for an output of the multiple outputs in response to one or more third instructions, identifying possibility connectivity between the multiple inputs and the multiple outputs in response to one or more fourth instructions.

In some embodiments, the act of displaying the connectivity, which has been identified or configured, in the graphical cross connectivity interface comprises at least one of displaying current, active connections between an input of the multiple inputs and at least some of the multiple outputs in the graphical cross connect interface, displaying current, active connections between an output of the multiple outputs and at least some of the multiple inputs in the graphical cross connect interface, displaying all possible connections between the multiple outputs and the multiple inputs in the graphical cross connect interface, and displaying all current, active connections between the multiple outputs and the multiple inputs in the graphical cross connect interface.

In some embodiments, the act of displaying the current, active connections between the input of the multiple inputs and the at least some of the multiple outputs in the graphical cross connect interface comprises at least one of representing the input with first emphasis or first distinction from remainder of the multiple inputs, querying the switch matrix or a related data structure to obtain the connectivity between the input and one or more outputs currently connected to the input, configuring or reconfiguring an on-screen display of the connectivity to emphasize the connectivity between the input and the one or more outputs currently connected to the input, and identifying possibility connectivity between the multiple inputs and the multiple outputs in response to one or more fourth instructions.

In some embodiments, the act of displaying the connectivity, which has been identified or configured, in the graphical cross connectivity interface comprises at least one of displaying current, active connections between an input of the multiple inputs and at least some of the multiple outputs in the graphical cross connect interface, displaying current, active connections between an output of the multiple outputs and at least some of the multiple inputs in the graphical cross connect interface, displaying all possible connections between the multiple outputs and the multiple inputs in the graphical cross connect interface, and displaying all current, active connections between the multiple outputs and the multiple inputs in the graphical cross connect interface.

In some embodiments, the act of displaying the current, active connections between the input of the multiple inputs and the at least some of the multiple outputs in the graphical cross connect interface comprises at least one of representing the input with first emphasis or first distinction from remainder of the multiple inputs, querying the switch matrix or a related data structure to obtain the connectivity between the input and one or more outputs currently connected to the input, configuring or reconfiguring an on-screen display of the connectivity to emphasize the connectivity between the input and the one or more outputs currently connected to the input, and representing the one or more outputs with second emphasis or second distinction from remainder of the multiple outputs.

In some embodiments, the act of displaying the all current, active connections comprises at least one of querying the switch matrix or a related data structure to obtain the connectivity for the all current, active connections between the multiple inputs and the multiple outputs, configuring or reconfiguring an on-screen display of the connectivity to emphasize all current, active connections between the multiple inputs and the multiple outputs, and representing the all current, active connections with graphical emphasis or distinction from one or more other connections.

In some embodiments, the act of identifying the one or more instructions from the graphical cross connectivity interface comprises at least one of identifying the one or more instructions from the graphical cross connectivity interface to display a global view mode, identifying the one or more instructions from the graphical cross connectivity interface to display an input focus view mode, identifying the one or more instructions from the graphical cross connectivity interface to display an output focus view mode, identifying the one or more instructions from the graphical cross connectivity interface to configure the connectivity of the switch matrix, identifying the one or more instructions from the graphical cross connectivity interface to manage switch matrix configuration, identifying the one or more instructions from the graphical cross connectivity interface to query status of the switch matrix, identifying the one or more instructions from the graphical cross connectivity interface to manage a plurality of settings, and identifying the one or more instructions from the graphical cross connectivity interface for signal attenuation or gain control.

Some embodiments are directed at a hardware system that may be invoked to perform any of the methods, processes, or sub-processes disclosed herein. The hardware system may include at least a user interface, one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

In some embodiments, the hardware system comprises a computing system that includes at least one processor or at least one processor core and a graphical cross connect interface, wherein the graphical cross connect interface is to identify one or more instructions from a graphical cross connect interface to configure connectivity between multiple inputs and multiple outputs, identify or configuring the connectivity between the multiple inputs and the multiple outputs in response to the one or more instructions, and display the connectivity, which has been identified or configured, in the graphical cross connect interface.

In some embodiments, the graphical cross connect interface that is to identify the one or more instructions from the graphical cross connectivity interface to configure the connectivity between multiple inputs and multiple outputs is further to identify one or more first instruction from the graphical cross connectivity interface to configure the connectivity between multiple inputs and multiple outputs. In some embodiments, the graphical cross connect interface that is to identify the one or more instructions from the graphical cross connectivity interface to configure the connectivity between multiple inputs and multiple outputs is further to identify one or more first instruction from the graphical cross connectivity interface to configure the connectivity between multiple inputs and multiple outputs.

In some embodiments, the graphical cross connect interface that is to identify the one or more instructions from the graphical cross connectivity interface to configure the connectivity between multiple inputs and multiple outputs is further to identify one or more second instruction from the graphical cross connectivity interface to display an input program mode for the connectivity between multiple inputs and multiple outputs. In some embodiments, the graphical cross connect interface that is to identify the one or more instructions from the graphical cross connectivity interface to configure the connectivity between multiple inputs and multiple outputs is further to identify one or more third instruction from the graphical cross connectivity interface to display an output program mode for the connectivity between multiple inputs and multiple outputs.

In some embodiments, the graphical cross connect interface that is to identify the one or more instructions from the graphical cross connectivity interface to configure the connectivity between multiple inputs and multiple outputs is further to identify one or more fourth instruction from the graphical cross connectivity interface to display a global view mode for the connectivity between multiple inputs and multiple outputs. In some embodiments, the graphical cross connect interface that is to identify or configure the connectivity between the multiple inputs and the multiple outputs in response to the one or more instructions is further to configure one or more inputs or one or more outputs in response to one or more first instructions.

In some embodiments, the graphical cross connect interface that is to identify or configure the connectivity between the multiple inputs and the multiple outputs in response to the one or more instructions is further to identify the connectivity for an input of the multiple inputs in response to one or more second instructions. In some embodiments, the graphical cross connect interface that is to identify or configure the connectivity between the multiple inputs and the multiple outputs in response to the one or more instructions is further to identify the connectivity for an output of the multiple outputs in response to one or more third instructions.

In some embodiments, the graphical cross connect interface that is to identify or configure the connectivity between the multiple inputs and the multiple outputs in response to the one or more instructions is further to identify possible connectivity between the multiple inputs and the multiple outputs in response to one or more fourth instructions. In some embodiments, the graphical cross connect interface that is to display the connectivity, which has been identified or configured, in the graphical cross connectivity interface is further to display current, active connections between an input of the multiple inputs and at least some of the multiple outputs in the graphical cross connect interface.

In some embodiments, the graphical cross connect interface that is to display the connectivity, which has been identified or configured, in the graphical cross connectivity interface is further to display current, active connections between an output of the multiple outputs and at least some of the multiple inputs in the graphical cross connect interface. In some embodiments, the graphical cross connect interface that is to display the connectivity, which has been identified or configured, in the graphical cross connectivity interface is further to display all possible connections between the multiple outputs and the multiple inputs in the graphical cross connect interface.

In some embodiments, the graphical cross connect interface that is to display the connectivity, which has been identified or configured, in the graphical cross connectivity interface is further to display all current, active connections between the multiple outputs and the multiple inputs in the graphical cross connect interface. In some embodiments, the graphical cross connect interface that is to display the current, active connections between the input of the multiple inputs and the at least some of the multiple outputs in the graphical cross connect interface is further to represent the input with first emphasis or first distinction from remainder of the multiple inputs.

In some embodiments, the graphical cross connect interface that is to display the connectivity, which has been identified or configured, in the graphical cross connectivity interface is further to display current, active connections between an input of the multiple inputs and at least some of the multiple outputs in the graphical cross connect interface. In some embodiments, the graphical cross connect interface that is to display the connectivity, which has been identified or configured, in the graphical cross connectivity interface is further to display current, active connections between an output of the multiple outputs and at least some of the multiple inputs in the graphical cross connect interface.

In some embodiments, the graphical cross connect interface that is to display the connectivity, which has been identified or configured, in the graphical cross connectivity interface is further to display all possible connections between the multiple outputs and the multiple inputs in the graphical cross connect interface. In some embodiments, the graphical cross connect interface that is to display the connectivity, which has been identified or configured, in the graphical cross connectivity interface is further to display all current, active connections between the multiple outputs and the multiple inputs in the graphical cross connect interface.

In some embodiments, the graphical cross connect interface that is to display the current, active connections between the input of the multiple inputs and the at least some of the multiple outputs in the graphical cross connect interface is further to represent the input with first emphasis or first distinction from remainder of the multiple inputs. In some embodiments, the graphical cross connect interface that is to display the current, active connections between the input of the multiple inputs and the at least some of the multiple outputs in the graphical cross connect interface is further to query a device including the multiple inputs and the multiple outputs or a related data structure to obtain the connectivity between the input and one or more outputs currently connected to the input.

In some embodiments, the graphical cross connect interface that is to display the current, active connections between the input of the multiple inputs and the at least some of the multiple outputs in the graphical cross connect interface is further to configure or reconfiguring an on-screen display of the connectivity to emphasize the connectivity between the input and the one or more outputs currently connected to the input. In some embodiments, the graphical cross connect interface that is to display the current, active connections between the input of the multiple inputs and the at least some of the multiple outputs in the graphical cross connect interface is further to represent the one or more outputs with second emphasis or second distinction from remainder of the multiple outputs.

In some embodiments, the graphical cross connect interface that is to display the all current, active connections is further to query a device including the multiple inputs and the multiple outputs or a related data structure to obtain the connectivity for the all current, active connections between the multiple inputs and the multiple outputs. In some embodiments, the graphical cross connect interface that is to display the all current, active connections is further to configure or reconfigure an on-screen display of the connectivity to emphasize all current, active connections between the multiple inputs and the multiple outputs.

In some embodiments, the graphical cross connect interface that is to display the all current, active connections is further to represent the all current, active connections with graphical emphasis or distinction from one or more other connections. In some embodiments, the graphical cross connect interface that is to identify the one or more instructions from the graphical cross connectivity interface is further to identify the one or more instructions from the graphical cross connectivity interface to display a global view mode.

In some embodiments, the graphical cross connect interface that is to identify the one or more instructions from the graphical cross connectivity interface is further to identify the one or more instructions from the graphical cross connectivity interface to display an input program mode. In some embodiments, the graphical cross connect interface that is to identify the one or more instructions from the graphical cross connectivity interface is further to identify the one or more instructions from the graphical cross connectivity interface to display an output program mode.

In some embodiments, the graphical cross connect interface that is to identify the one or more instructions from the graphical cross connectivity interface is further to identify the one or more instructions from the graphical cross connectivity interface to configure the connectivity between the multiple inputs and the multiple outputs. In some embodiments, the graphical cross connect interface that is to identify the one or more instructions from the graphical cross connectivity interface is further to identify the one or more instructions from the graphical cross connectivity interface to manage one or more configurations of a device including the multiple inputs and the multiple outputs.

In some embodiments, the graphical cross connect interface that is to identify the one or more instructions from the graphical cross connectivity interface is further to identify the one or more instructions from the graphical cross connectivity interface to query status of the switch matrix. In some embodiments, the graphical cross connect interface that is to identify the one or more instructions from the graphical cross connectivity interface is further to identify the one or more instructions from the graphical cross connectivity interface to manage a plurality of settings. In some embodiments, the graphical cross connect interface that is to identify the one or more instructions from the graphical cross connectivity interface is further to identify the one or more instructions from the graphical cross connectivity interface for signal attenuation or gain control.

Some embodiments are directed at an article of manufacture that includes a non-transitory machine-accessible storage medium having stored thereupon a sequence of instructions which, when executed by a computing device having at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below. The methods, processes, or sub-processes disclosed herein in these embodiments further comprises the act of identifying one or more instructions from a graphical cross connectivity interface to configure connectivity between multiple inputs and multiple outputs, the act of identifying or configuring the connectivity between the multiple inputs and the multiple outputs in response to the one or more instructions, and the act of displaying the connectivity, which has been identified or configured, in the graphical cross connectivity interface.

In some embodiments, the act of identifying the one or more instructions from the graphical cross connectivity interface to configure the switch matrix comprises at least one of identifying one or more first instruction from the graphical cross connectivity interface to configure the switch matrix, identifying one or more second instruction from the graphical cross connectivity interface to display an input focus view mode for the switch matrix, identifying one or more third instruction from the graphical cross connectivity interface to display an output focus view mode for the switch matrix, and identifying one or more third instruction from the graphical cross connectivity interface to display a global view mode for the switch matrix.

In some embodiments, the act or process of identifying or configuring the connectivity between the multiple inputs and the multiple outputs in response to the one or more instructions comprises at least one of configuring one or more inputs or one or more outputs in response to one or more first instructions, identifying the connectivity for an input of the multiple inputs in response to one or more second instructions, identifying the connectivity for an output of the multiple outputs in response to one or more third instructions, identifying possibility connectivity between the multiple inputs and the multiple outputs in response to one or more fourth instructions.

In some embodiments, the act of displaying the connectivity, which has been identified or configured, in the graphical cross connectivity interface comprises at least one of displaying current, active connections between an input of the multiple inputs and at least some of the multiple outputs in the graphical cross connect interface, displaying current, active connections between an output of the multiple outputs and at least some of the multiple inputs in the graphical cross connect interface, displaying all possible connections between the multiple outputs and the multiple inputs in the graphical cross connect interface, and displaying all current, active connections between the multiple outputs and the multiple inputs in the graphical cross connect interface.

In some embodiments, the act of displaying the current, active connections between the input of the multiple inputs and the at least some of the multiple outputs in the graphical cross connect interface comprises at least one of representing the input with first emphasis or first distinction from remainder of the multiple inputs, querying the switch matrix or a related data structure to obtain the connectivity between the input and one or more outputs currently connected to the input, configuring or reconfiguring an on-screen display of the connectivity to emphasize the connectivity between the input and the one or more outputs currently connected to the input, and identifying possibility connectivity between the multiple inputs and the multiple outputs in response to one or more fourth instructions.

In some embodiments, the act of displaying the connectivity, which has been identified or configured, in the graphical cross connectivity interface comprises at least one of displaying current, active connections between an input of the multiple inputs and at least some of the multiple outputs in the graphical cross connect interface, displaying current, active connections between an output of the multiple outputs and at least some of the multiple inputs in the graphical cross connect interface, displaying all possible connections between the multiple outputs and the multiple inputs in the graphical cross connect interface, and displaying all current, active connections between the multiple outputs and the multiple inputs in the graphical cross connect interface.

In some embodiments, the act of displaying the current, active connections between the input of the multiple inputs and the at least some of the multiple outputs in the graphical cross connect interface comprises at least one of representing the input with first emphasis or first distinction from remainder of the multiple inputs, querying the switch matrix or a related data structure to obtain the connectivity between the input and one or more outputs currently connected to the input, configuring or reconfiguring an on-screen display of the connectivity to emphasize the connectivity between the input and the one or more outputs currently connected to the input, and representing the one or more outputs with second emphasis or second distinction from remainder of the multiple outputs.

In some embodiments, the act of displaying the all current, active connections comprises at least one of querying the switch matrix or a related data structure to obtain the connectivity for the all current, active connections between the multiple inputs and the multiple outputs, configuring or reconfiguring an on-screen display of the connectivity to emphasize all current, active connections between the multiple inputs and the multiple outputs, and representing the all current, active connections with graphical emphasis or distinction from one or more other connections.

In some embodiments, the act of identifying the one or more instructions from the graphical cross connectivity interface comprises at least one of identifying the one or more instructions from the graphical cross connectivity interface to display a global view mode, identifying the one or more instructions from the graphical cross connectivity interface to display an input focus view mode, identifying the one or more instructions from the graphical cross connectivity interface to display an output focus view mode, identifying the one or more instructions from the graphical cross connectivity interface to configure the connectivity of the switch matrix, identifying the one or more instructions from the graphical cross connectivity interface to manage switch matrix configuration, identifying the one or more instructions from the graphical cross connectivity interface to query status of the switch matrix, identifying the one or more instructions from the graphical cross connectivity interface to manage a plurality of settings, and identifying the one or more instructions from the graphical cross connectivity interface for signal attenuation or gain control.

BRIEF DESCRIPTION OF THE FIGURES

The drawings illustrate the design and utility of various embodiments. It should be noted that the figures are not drawn to scale and that elements of similar structures or functions are represented by like reference numerals throughout the figures. In order to better appreciate how to obtain the above-recited and other advantages and objects of various embodiments, a more detailed description of the inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF ILLUSTRATED EMBODIMENTS

Various embodiments are directed to a method, system, and computer program product for implementing multiple-patterning-aware design rule check for an electronic design.

Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of various embodiments, unless otherwise specifically described in particular embodiment(s) or recited in the claim(s). Where certain elements of embodiments may be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments of the invention. Further, embodiments encompass present and future known equivalents to the components referred to herein by way of illustration. More details about various processes or modules to implement various embodiments are further described below with reference to FIGS. 1-10.

Figure 1:
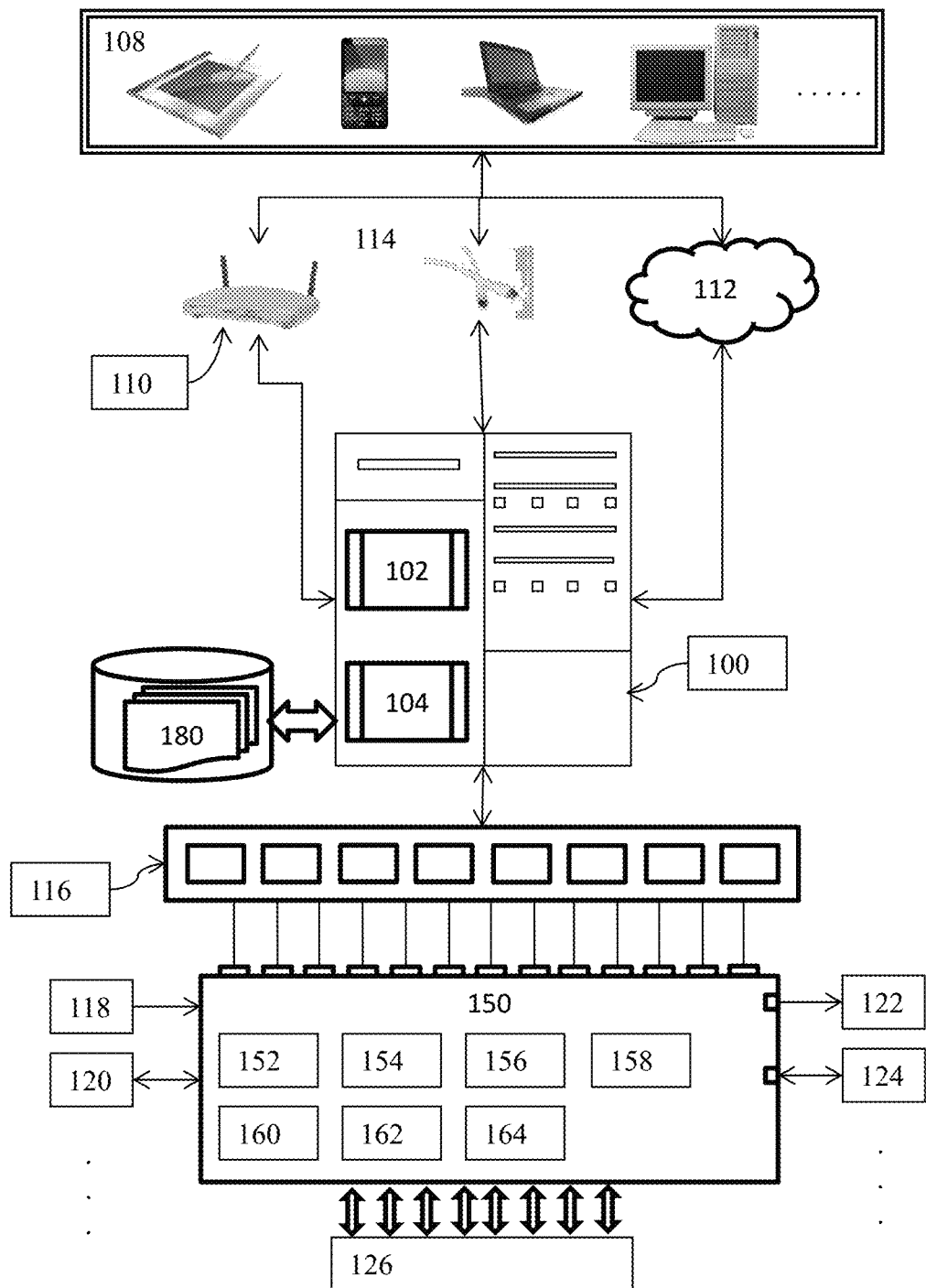
FIG. 1 illustrates a schematic representation of exemplary implementations for providing graphical cross connectivity and dynamic configurability for interconnection between multiple inputs and multiple outputs in some embodiments.

FIG. 1 illustrates a schematic representation of exemplary implementations for providing graphical cross connectivity and dynamic configurability for a switch matrix in some embodiments. More specifically, FIG. 1 illustrates various computing devices 108, such as but not limited to a tablet computing device, a mobile phone, a laptop computer, a desktop computer, a terminal connected to a server, etc. that includes a user interface for providing graphical cross connectivity and dynamic configurability for a switch matrix. These various computing devices are operatively connected to and thus interact with a server 100 via wireless connection 110 (e.g., Wi-Fi, Bluetooth, cellular network, etc.), wired connection 114 (e.g., Ethernet connection(s)), or generally the Internet 112 in some embodiments. The server 100 may include code 102 in one or more server scripting languages (e.g., 1. ASP, ActiveVFP, ASP.NET, ColdFusion Markup Language, Java via JavaServer Pages, JavaScript using Server-side JavaScript, Lua, Perl CGI, PHP (Open Source Scripting), Python, Ruby, SMX, Lasso, etc.) that serves as a bridge between the various computing devices 108 and an RPC (remote procedure call) server, an RI (remote invocation) server, or a (RMI) remote method invocation server 116 in some embodiments.

In some embodiments, the server 100 may also comprise the client application 102 for the RPC, RI, or RMI server 116 (hereinafter RPC server.) In these embodiments, the RPC server acts as a server for the switch matrix 150, and thus the server 100 includes the corresponding client application(s) 102. In some embodiments, the server 100 further interacts with and accesses one or more computer readable media 180 having stored thereupon one or more files or one or more databases. The RPC server 116 is in turn operatively connected to the switch matrix 150 to configure or operate on the switch matrix. In some embodiments, the switch matrix 150 may include one or more attenuators 152, one or more filters 154, one or more amplification modules 156, one or more couplers 158 (e.g., directional coupler(s)), one or more signal conditioners 160, a plurality of electro-mechanical switches, solid-state switches, or a combination thereof 162, one or more splitters 164, or the control hardware that interfaces with, for example but not limited to a device under test 126. The switch matrix 150 is operatively connected to a plurality of inputs (118, 120, etc.) and a plurality of outputs (122, 124, etc.) to route signals between the plurality of inputs and the plurality of outputs in some embodiments. In some of these embodiments, the one or more electro-mechanical switches 162 may include one or more latch relay switches or one or more non-latching switches, or combinations thereof. In some embodiments, the one or more solid-state switches 162 may include one or more PIN diode switches, one or more FET's (field-effect transistor or field-effect transistors), one or more hybrid switches, or combinations thereof.

Figure 2:
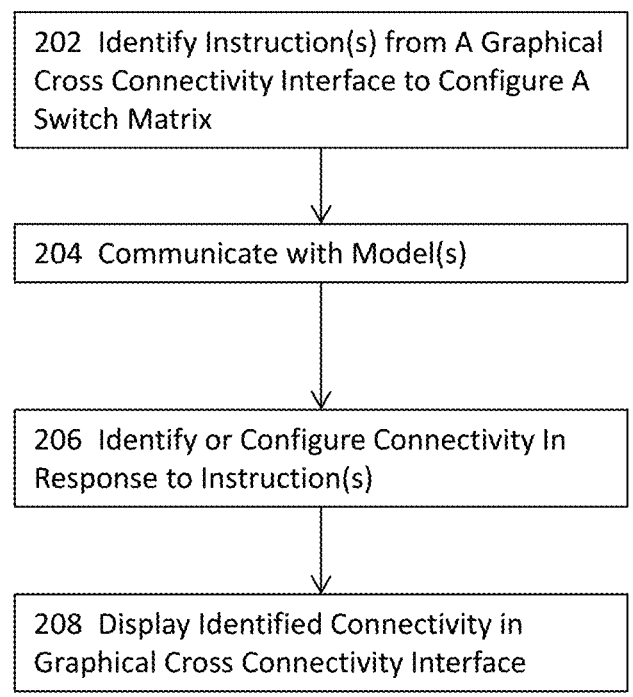
FIG. 2 illustrates a top level flow diagram for providing graphical cross connectivity and dynamic configurability for interconnection between multiple inputs and multiple outputs in some embodiments.

FIG. 2 illustrates a top level flow diagram for providing graphical cross connectivity and dynamic configurability for a switch matrix in some embodiments. In one or more embodiments, the method for providing graphical cross connectivity and dynamic configurability for a switch matrix illustrated in FIG. 2 may include the process 202 of identifying one or more instructions from a graphical cross connectivity user interface to configure a switch matrix. More details about 206 will be described in subsequent paragraphs with reference to FIG. 3.

In some embodiments, the method illustrated in FIG. 2 may comprise the process 204 of communicating the one or more instructions identified at 202 with one or more models. In some embodiments, the one or more models may include one or more databases (such as 180), one or more code or applications (e.g., 102 and/or 104). For example, the method may communicate an instruction to configure the switch matrix 150 through a PHP backend code 102 and an RPC client application 104 on server 100 to the server 116 so as to invoke the processes on the server 116 to configure the switch matrix 150.

In some embodiments, the method illustrated in FIG. 2 may comprise the process 206 of identifying or configuring the connectivity between a plurality of inputs and a plurality of outputs in response to the one or more instructions identified at 202. More details about 206 will be described in subsequent paragraphs with reference to FIG. 4.

In some embodiments, the method illustrated in FIG. 2 may comprise the process 206 of displaying the connectivity identified or configured at 206 in at least a part of a graphical cross connectivity user interface. More details about 206 will be described in subsequent paragraphs with reference to FIG. 5.

Figure 3:
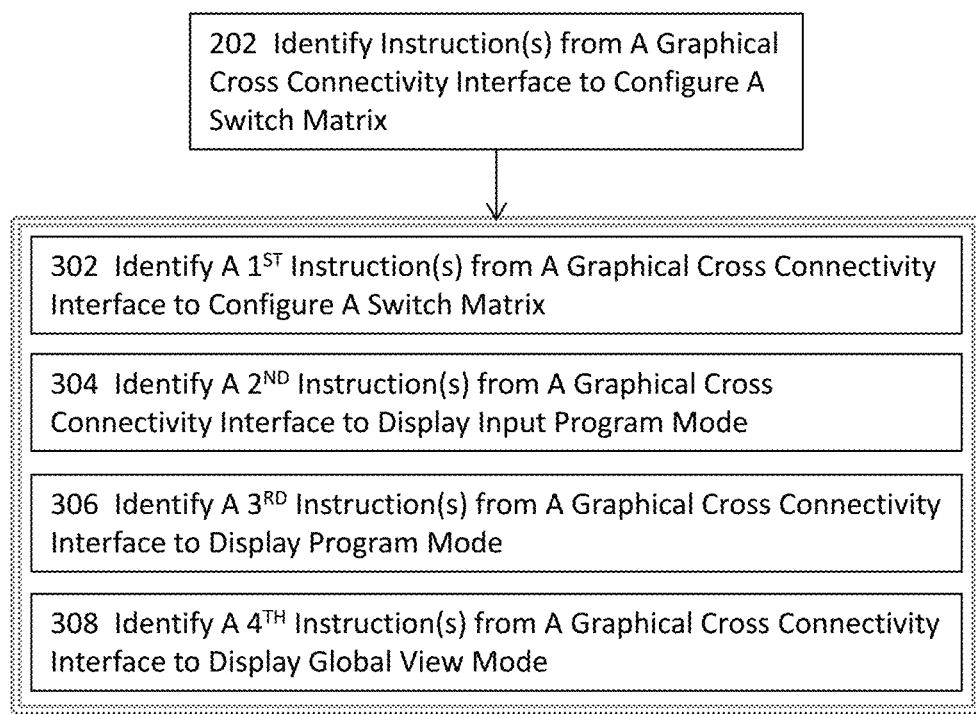
FIG. 3 illustrates more details about the flow diagram illustrated in FIG. 2 in some embodiments.

FIG. 3 illustrates more details about the flow diagram illustrated in FIG. 2 in some embodiments. More specifically, FIG. 3 illustrates more details about the process 202 of identifying one or more instructions from a graphical cross connectivity user interface to configure a switch matrix.

In some embodiments, process 202 may include the process 302 of Identify one or more first instructions from a graphical cross connectivity interface to configure a switch matrix. In some of these embodiments, the one or more first instructions are used to, for example, connect specific inputs to specific outputs, add one or more inputs or one or more outputs, or remove one or more existing inputs or one or more existing outputs.

In some embodiments, process 202 may include the process 304 of identifying one or more second instructions from a graphical cross connectivity interface to display input program mode. In some embodiments, the input program mode includes a display mode that graphically, visually displays at least the current active connections of one or more identified inputs. For example, the one or more second instructions may request a display of current, active connections for input no. 2 and input no. 7 of a plurality of inputs. Process 202 or 304 may then identify such instructions. In some embodiments, various instructions may be identified by the graphical cross connectivity interface via a user's touching one or more specific areas or symbols (e.g., graphical buttons in the graphical cross connectivity interface) in the interface, a user's voice input via built-in voice recognition module(s), textual input via reading a file or via direct entry by the user, or combinations thereof. In the example above, a user may select input no. 2 and input no. 7 by either touching with the user's finger or using a point device (e.g., a mouse or a stylus for mobile computing devices) to click on the two symbolic icons respectively corresponding to these two inputs.

In some embodiments, process 202 may include the process 306 of identifying one or more third instructions from a graphical cross connectivity interface to display output program mode. In some embodiments, the output program mode includes a display mode that graphically, visually displays at least the current active connections of one or more identified outputs. For example, the one or more second instructions may request a display of current, active connections for input no. 4 and input no. 11 of a plurality of outputs. Process 202 or 306 may then identify such instructions. In some embodiments, various instructions may be identified by the graphical cross connectivity interface via a user's touching one or more specific areas or symbols (e.g., graphical buttons in the graphical cross connectivity interface) in the interface, a user's voice input via built-in voice recognition module(s), textual input via reading a file or via direct entry by the user, or combinations thereof. In the example above, a user may select output no. 4 and input no. 11 by either touching with the user's finger or using a point device (e.g., a mouse or a stylus for mobile computing devices) to click on the two symbolic icons respectively corresponding to these two outputs in the graphical cross connect interface.

In some embodiments, process 202 may include the process 308 of identifying one or more fourth instructions from a graphical cross connectivity interface to display global view mode. In some embodiments, a global view mode includes all current, active connections between a plurality of inputs and a plurality of outputs. In some embodiments, a global view mode includes all possible, although not necessarily active, connections between a plurality of inputs and a plurality of outputs. In the latter embodiments, the method and system described herein also distinguish a current, active connection from a possible but not necessarily active connection by, for example but not limited to, using different graphical representations (e.g., different colors, different line types, different thicknesses of lines, etc.) to represent these two different types of connectivity information.

Figure 4:
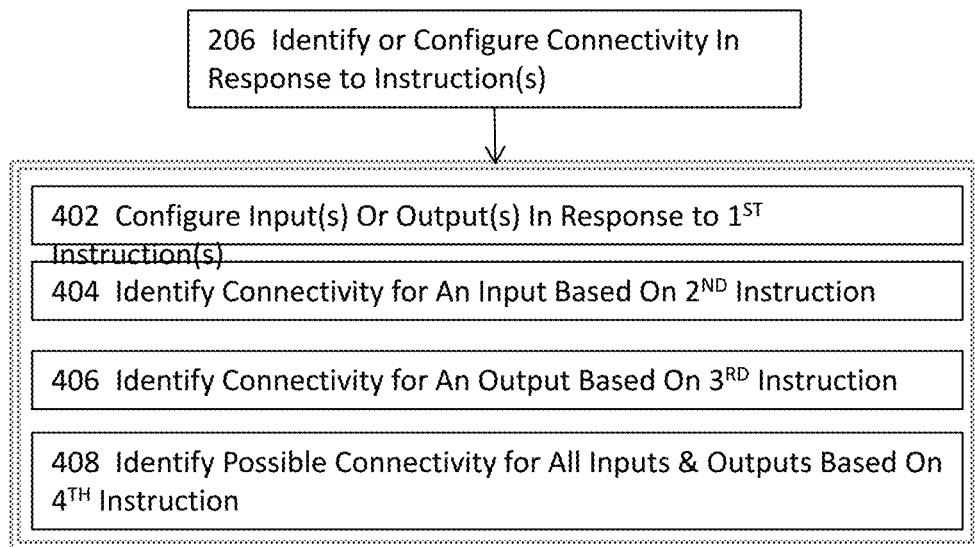
FIG. 4 illustrates more details about the flow diagram illustrated in FIG. 2 in some embodiments.

FIG. 4 illustrates more details about the flow diagram illustrated in FIG. 2 in some embodiments. More specifically, FIG. 4 illustrates more details about process 206 of FIG. 2. In some embodiments, the process 206 may comprise the process 402 of configuring one or more inputs or one or more outputs in response to one or more first instruction(s). In these embodiments, process 206 may be used to configure one or more inputs to one or more outputs. For example, process 206 may be used to add or remove a connection between an input and an output if the user clicks on the "Connect" button (e.g., 916 of FIG. 9) and selects an input (e.g., 906 of FIG. 9) and the corresponding output (e.g., 904 of FIG. 9).

In some embodiments, the process 206 may comprise the process 404 of identifying the connectivity for an input based on one or more second instructions. In some of these embodiments, process 206 may use a second instruction identified at 202 or more specifically at 304 and then identifies the current, active connections between the identified input(s) and its (or their) corresponding output(s). In some embodiments, only one input is identified, and process 206 identifies all the current, active connections for the single input. In some embodiments, multiple inputs are identified, and process 206 identifies, for each of the identified inputs, the current, active connections and may assign a different graphical representation to the identified current, active connections for each identified input. In some embodiments, the method may display the identified connectivity for an input in an input program mode on the graphical cross connect interface.

In some embodiments, the process 206 may comprise the process 406 of identifying the connectivity for an output based at least in part on one or more third instructions. In some of these embodiments, process 206 may use a second instruction identified at 202 or more specifically at 306 and then identifies the current, active connections between the identified output(s) and its (or their) corresponding input(s). In some embodiments, only one output is identified, and process 206 identifies all the current, active connections for the single output. In some embodiments, multiple outputs are identified, and process 206 identifies, for each of the identified outputs, the current, active connections and may assign a different graphical representation to the identified current, active connections for each identified output. In some embodiments, the method may display the identified connectivity for an output in an output program mode on the graphical cross connect interface.

Figure 13:
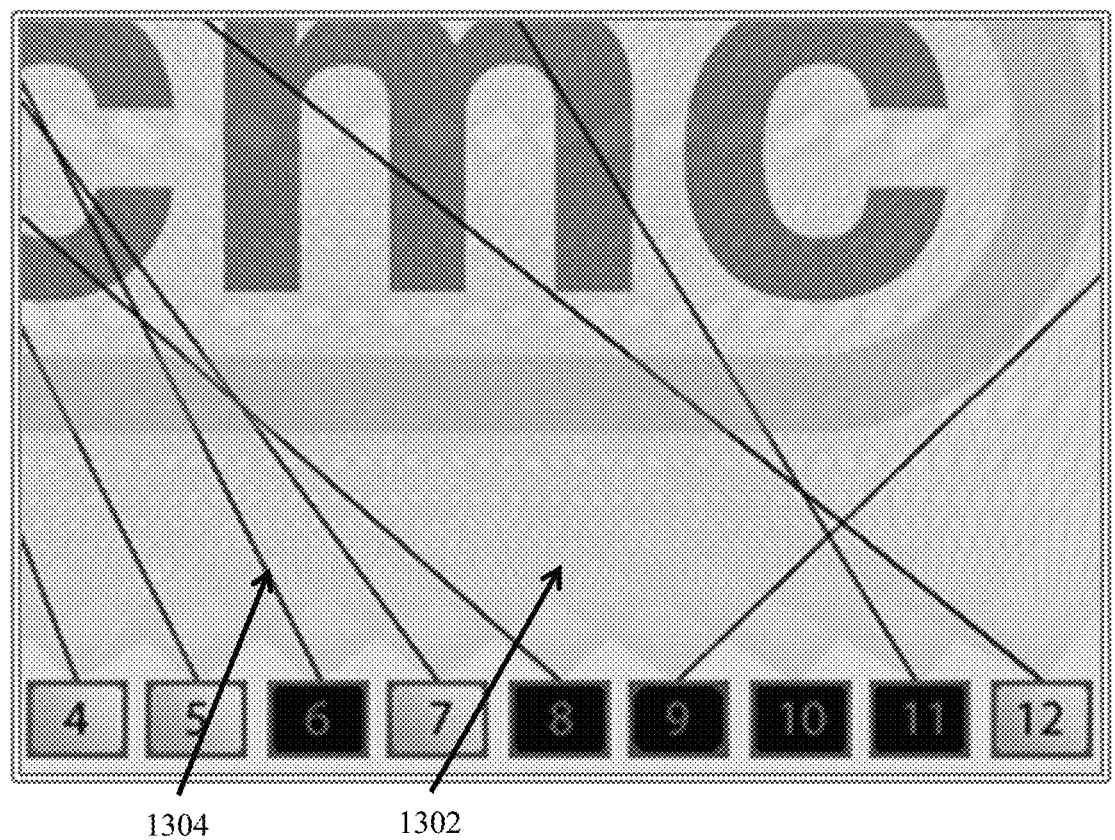
FIG. 13 illustrates a part of an exemplary user interface for providing graphical cross connectivity and dynamic configurability for interconnection between multiple inputs and multiple outputs in some embodiments.

In some embodiments, the process 206 may comprise the process 408 of identifying possible connectivity between all inputs and all outputs based at least in part on the identified one or more fourth instructions. In these embodiments, process 408 identifies all practically possible connections between the plurality of inputs and the plurality of outputs. In some embodiments, the graphical cross connect interface always displays a de-emphasized view for all practical possible connections in the graphical cross connect interface such as what is shown by 1302 of FIG. 13. 1304 of FIG. 13 illustrates a current, active connection, unless the option to display all possible connections is turned off or deselected. As it may be seem from FIG. 13, 1302 is presented in a de-emphasized manner than 1304.

Figure 5:
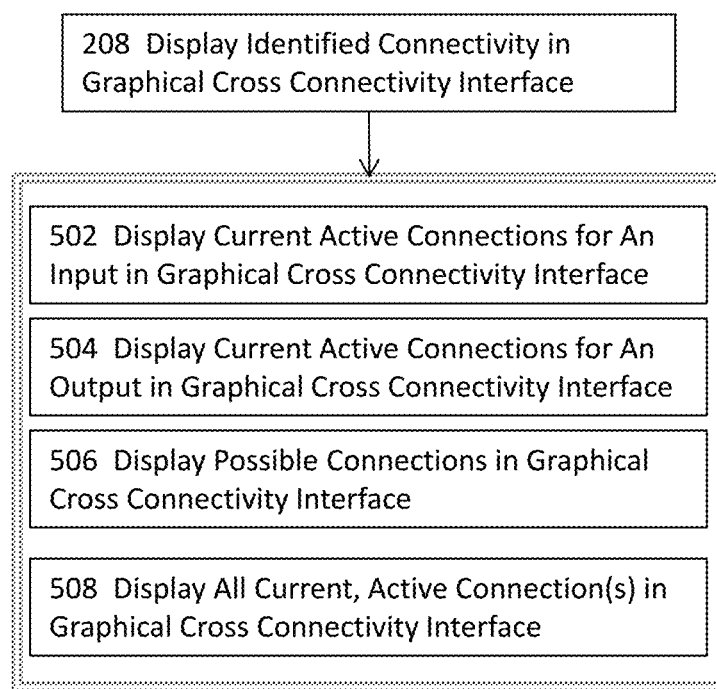
FIG. 5 illustrates more details about the flow diagram illustrated in FIG. 2 in some embodiments.

FIG. 5 illustrates more details about the flow diagram illustrated in FIG. 2 in some embodiments. More specifically, FIG. 5 illustrates more details about process 208 of FIG. 2. In some embodiments, the process 208 may include the process 502 of displaying current, active connections for an input in the graphical cross connectivity interface. In some embodiments, process 502 displays the current, active connections for an input in an input program model in the graphical cross connectivity interface.

In some embodiments, the process 208 may include the process 504 of displaying current, active connections for an output in the graphical cross connectivity interface. In some embodiments, process 504 displays the current, active connections for an output in an input program mode in the graphical cross connectivity interface. In some embodiments, the process 208 may include the process 506 of displaying all practically possible connections in graphical cross connectivity interface.

In some embodiments, the process 208 may include the process 508 of displaying all current, active connection(s) in graphical cross connectivity interface. In some embodiments, process 508 displays all current, active connection(s) in a global view mode in graphical cross connectivity interface. In some embodiments, the global view mode may be overlaid with the program mode (e.g., input program mode or output program mode) with one or more graphical or visible distinctions to differentiate all current, active connections from any selected program mode.

Figure 6:
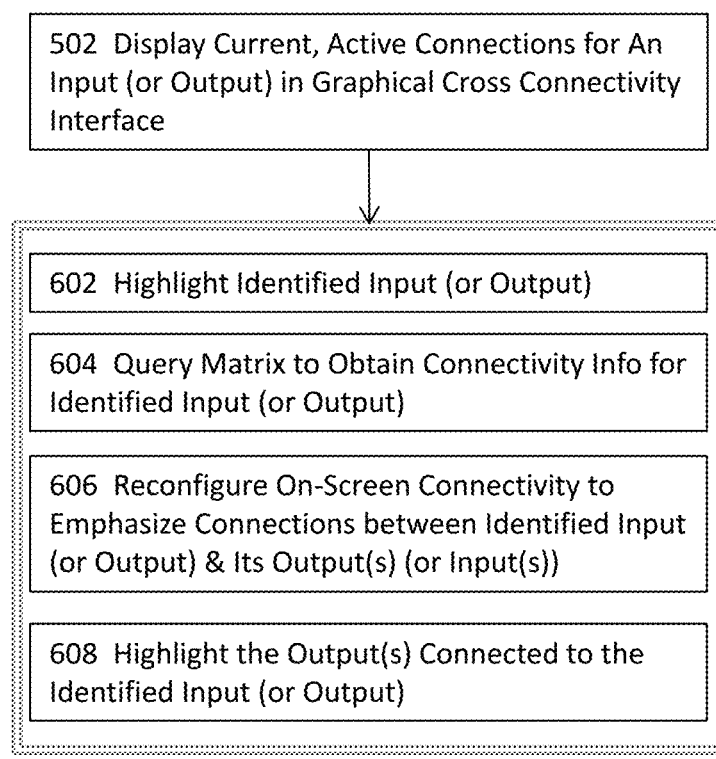
FIG. 6 illustrates more details about the flow diagram illustrated in FIG. 5 in some embodiments.

FIG. 6 illustrates more details about the flow diagram illustrated in FIG. 5 in some embodiments. More specifically, FIG. 6 illustrates more details about process 502 of FIG. 5 to enable the selection or identification of one or more inputs, one or more outputs, one or more connections, or combinations thereof. In some embodiments, the process 502 may include the process 602 of highlighting one or more identified inputs, one or more identified outputs, or one or more connections including one or more current, active connections. In some embodiments, the process 502 may include the process 604 of querying the switch matrix or a data structure storing status, states, or information of the switch matrix to obtain the connectivity information for the identified one or more inputs, one or more outputs, or one or more connections.

In some embodiments, the process 502 may include the process 606 of reconfiguring the on-screen display of the connectivity information to emphasize one or more connections between the identified one or more inputs and their respective one or more corresponding outputs. In some embodiments, the process 502 may include the process 606 of reconfiguring the on-screen display of the connectivity information to emphasize one or more connections between the identified one or more outputs and their respective one or more corresponding inputs. In some embodiments, the process 502 may include the process 606 of reconfiguring the on-screen display of the connectivity information to emphasize the one or more connections and/or their respective, associated input(s) and output(s). In some embodiments, process 606 may use a different graphical scheme (e.g., different colors, different shapes, different linetypes, etc.) for each identified input, output, or connection and its associated connections (for each identified input or output) or associated input(s) and output(s) (for each identified connection).

In some embodiments, the process 502 may include the process 608 of highlighting one or more outputs (or one or more inputs) connected to the identified input (or the identified output). For example, a user may identify a specific input to show an input program mode. Process 502 or 608 may then display the specific input and its associated one or more outputs that are currently connected to the specific input in one or more distinguishing schemes to differentiate the specific input from the remaining unselected inputs, to differentiate the associated one or more outputs from the remaining outputs, or to differentiate the identified input from its associated one or more outputs.

Figure 7:
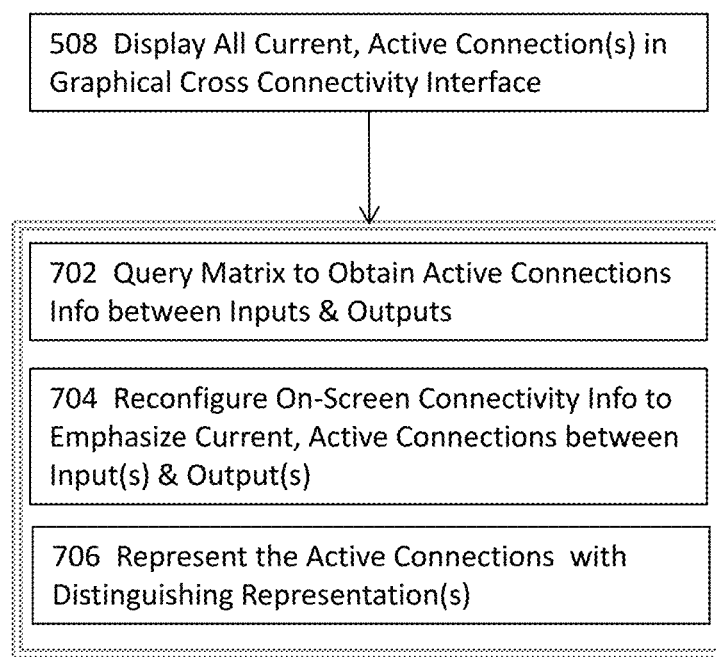
FIG. 7 illustrates more details about the flow diagram illustrated in FIG. 5 in some embodiments.

FIG. 7 illustrates more details about the flow diagram illustrated in FIG. 5 in some embodiments. More specifically, FIG. 7 illustrates more details about process 508 of FIG. 5. In some embodiments, the process 508 may include the process 702 of querying the switch matrix or a data structure storing status, states, or information of the switch matrix to obtain connectivity information between a plurality of inputs and a plurality of outputs based at least upon the instruction(s) received or identified at, for example, 202.

In some embodiments, the process 508 may include the process 704 of configuring or reconfiguring the on-screen display of the connectivity information to emphasize current, active connections between the input(s) and the output(s). In some embodiments, the process 508 may include the process 706 of representing the current, active connections with one or more distinguishing representations with, for example, distinguishing graphical schemes. For example, the input currently identified may be graphically represented in a different scheme than the output that is currently connected to the input. As another example, the connections associated with a first identified input may be graphically represented in a different scheme than the connections associated with a second identified input in an input program mode.

Figure 8:
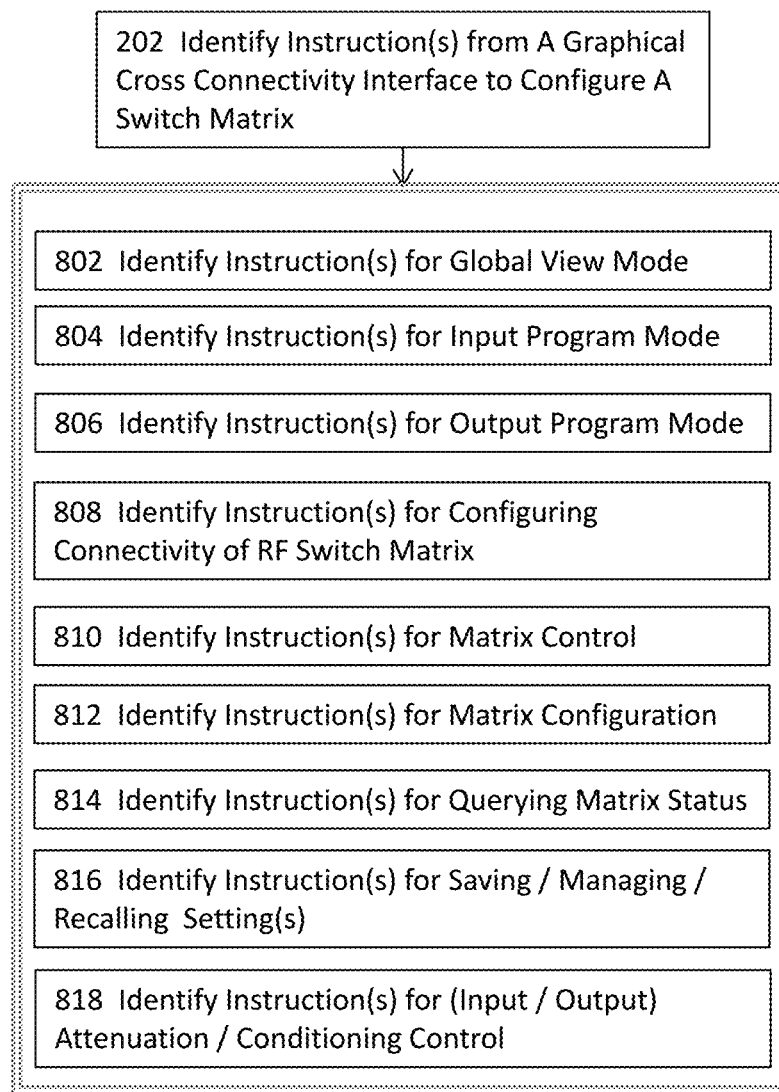
FIG. 8 illustrates more details about the flow diagram illustrated in FIG. 2 in some embodiments.

FIG. 8 illustrates more details about the flow diagram illustrated in FIG. 2 in some embodiments. More specifically, FIG. 8 illustrates more details about process 202 of FIG. 2. In some embodiments, FIG. 8 provides some functions or capability that a graphical cross connect interface may provide. In some embodiments, the instructions described below may be identified by either touching or sliding or with other gestures with the user's finger or using a point device (e.g., a mouse or a stylus for mobile computing devices) to click on the appropriate portion of a graphical cross connect interface.

In some embodiments, process 202 may include the process 802 of identifying one or more instructions for a global view mode. In some embodiments, process 202 may include the process 804 of identifying one or more instructions for an input program mode. In some embodiments, process 202 may include the process 806 of identifying one or more instructions for an output program mode. In some embodiments, process 202 may include the process 808 of identifying one or more instructions for configuring the connectivity of an RF switch matrix.

In some embodiments, process 202 may include the process 810 of identifying one or more instructions for matrix control. In some embodiments, matrix control may comprise a process of querying the switch matrix or a data structure storing status, states, or information of the switch matrix to obtain one or more query results (e.g., the status, states, temperatures, connections, the switch matrix location, or one or more positions of one or more switches, etc.) for the switch matrix.

In some embodiments, process 202 may include the process 812 of identifying one or more instructions for configuring or reconfiguring the switch matrix. In some embodiments, the one or more instructions for configuring or reconfiguring switch matrix may include, for example but not limited to, an instruction to add a switch, an instruction to remove a switch, an instruction to add a connection for an input or an output, an instruction to remove a connection from an input or an output, an instruction to set one or more alarms, etc. For example, process 812 may identify a temperature alarm in response to sensor readings. It shall be noted that although some switch matrices do not generate much heat during operation despite the amplification modules therein, these switch matrices may nonetheless have built-in temperature sensor(s) to monitor, for example, the operating temperature of the environment in which the switch matrix is located.

In some embodiments, process 202 may include the process 814 of identifying one or more instructions for querying the status of the switch matrix. For example, process 814 may identify one or more instructions for querying the source(s) of an alarm (e.g., the status of the power supply, the status or operational speed of one or more fans, temperatures, etc.). In some embodiments, process 202 may include the process 816 of identifying one or more instructions for saving, managing, or recalling one or more settings for the switch matrix or for any other parts of the system described herein. In some embodiments, the settings may be stored with a custom identifier (e.g., a user-defined filename) in a volatile or non-volatile computer readable medium or media. In some embodiments, the settings may be stored as multiple different versions for the same filename. In some embodiments, the settings may be stored with custom metadata such as a brief description of a particular version of settings to briefly describe these settings.

In some embodiments, process 202 may include the process 818 of identifying one or more instructions for input and/or output attenuation, conditioning, or amplification control. For example, the graphical cross control interface may provide a macroscopic control (e.g., 1016 of FIG. 10) and/or a microscopic control (e.g., 1018 of FIG. 10) for gain or attenuation of any particular connection, input, or output.

Figure 9:
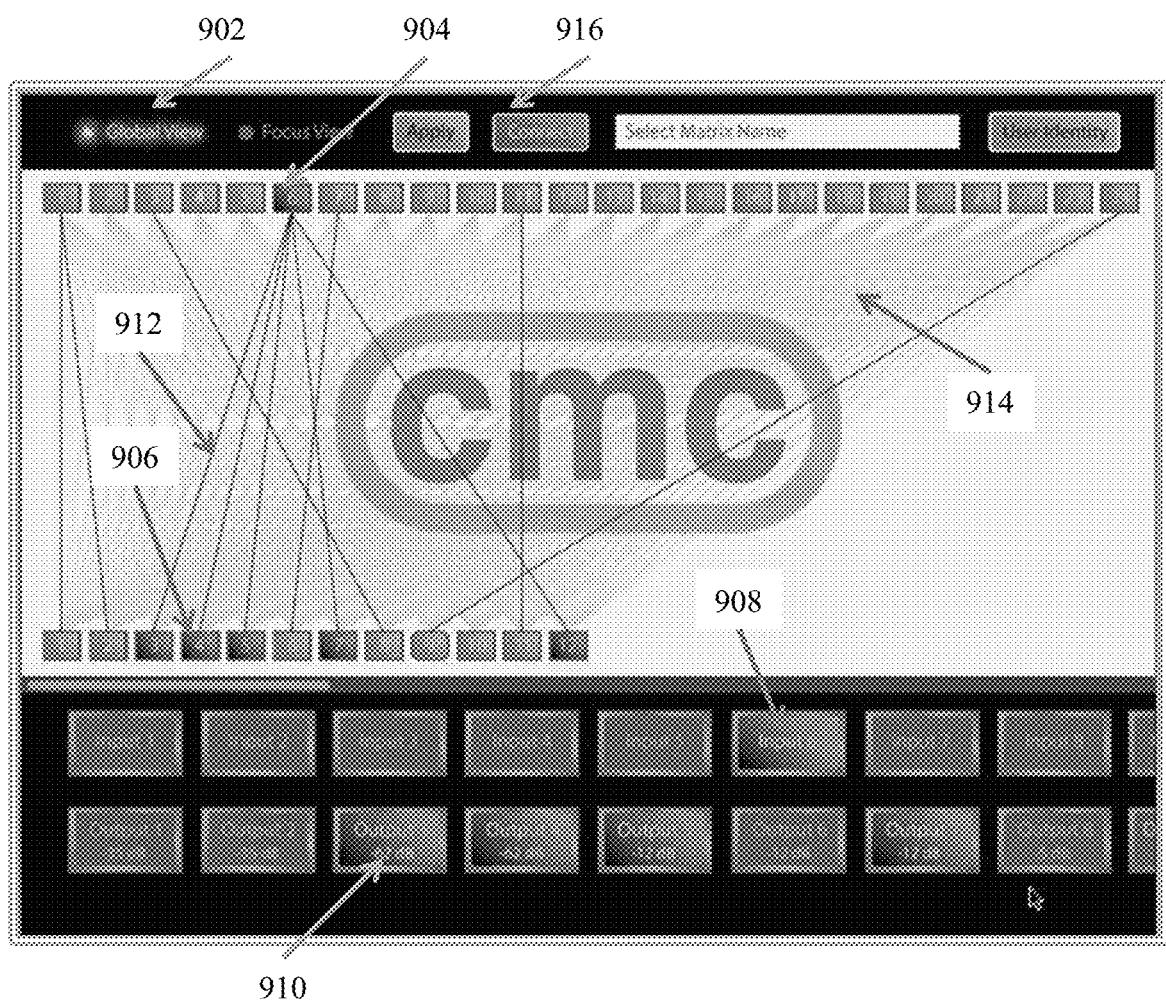
FIG. 9 illustrates an exemplary user interface for providing graphical cross connectivity and dynamic configurability for interconnection between multiple inputs and multiple outputs in some embodiments.

FIG. 9 illustrates an exemplary user interface for providing graphical cross connectivity and dynamic configurability for a switch matrix in some embodiments. More specifically, FIG. 9 illustrate a portion of an exemplary graphical cross connect interface. In some embodiments, the exemplary graphical cross connect interface may include one or more of a global view selector 902, a display symbol 904 for an identified output from multiple outputs, and a display symbol 906 for an identified input from multiple inputs. In some embodiments, the graphical cross connect interface may comprise one or more output buttons 910 arranged in one or patterns or groups for selectable outputs and/or one or more input buttons 908 arranged in one or patterns or groups for selectable inputs, each of which, when activated (e.g., by gestures, touching, or clicking, voice input, etc.), changes its graphical representation (e.g., highlighted, etc.) and triggers one or more instructions to be transmitted to the pertinent processes or modules to indicate that a particular input or output has been selected.

In some embodiments, the graphical cross connect interface may comprise a graphical representation of current, active connections 912. In some embodiments, the graphical cross connect interface may comprise a graphical representation of all practically possible connections 914 between the multiple inputs and the multiple outputs. With this graphical representation of all practically possible connections 914, if there is no line between a specific input and a specific output, this means there is no practically possible connection between this specific input and the specific output. In some embodiments, the graphical cross connect interface may comprise a graphical symbol which, when activated (e.g., by gestures, touching, or clicking, etc.), causes one or more instructions to be transmitted to pertinent modules or processes to indicate connectivity changes or attempt to make connectivity changes between one or more inputs and one or more outputs.

Figure 10:
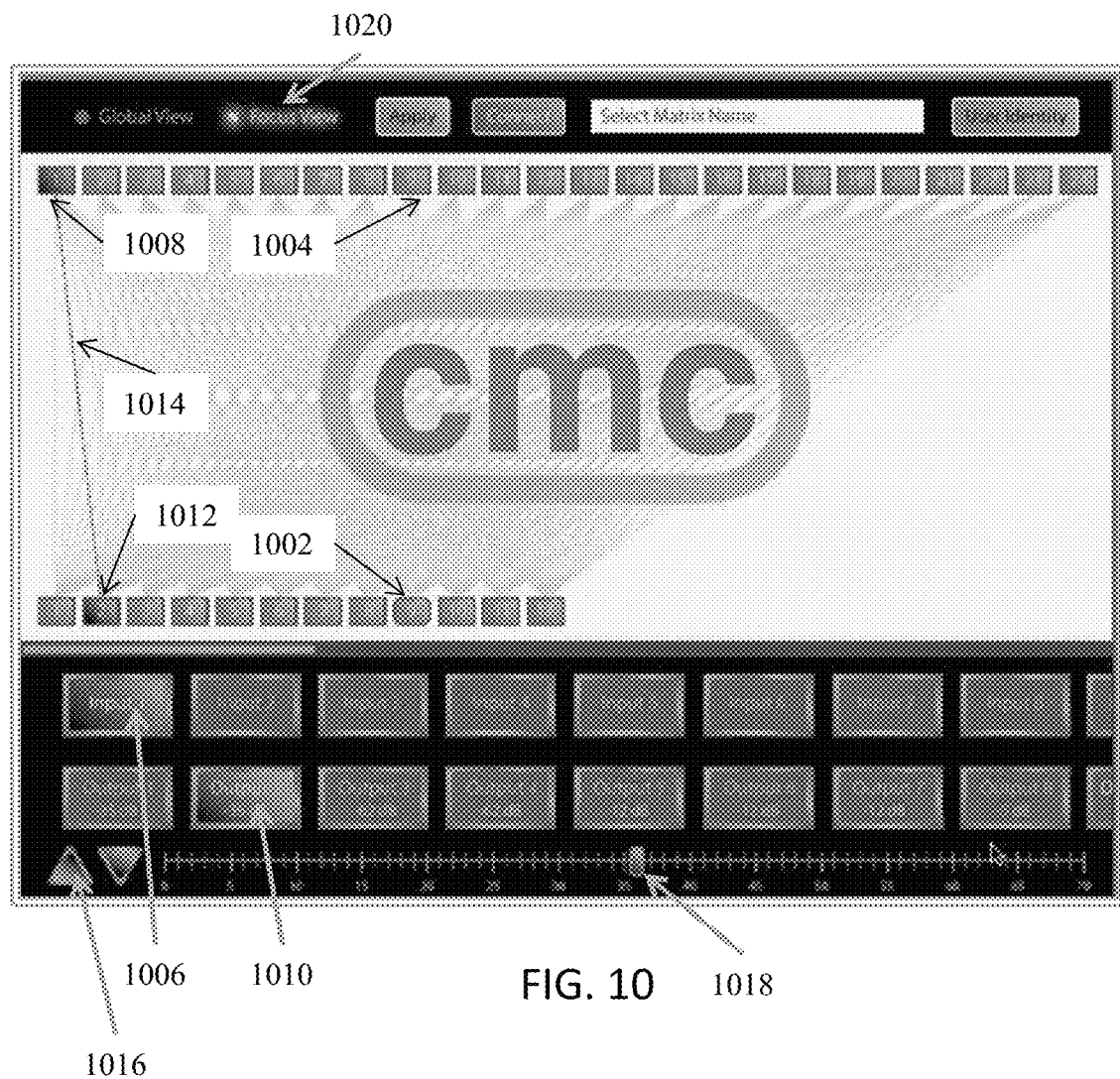
FIG. 10 illustrates an exemplary user interface for providing graphical cross connectivity and dynamic configurability for interconnection between multiple inputs and multiple outputs in some embodiments.

FIG. 10 illustrates an exemplary user interface for providing graphical cross connectivity and dynamic configurability for a switch matrix in some embodiments. More specifically, FIG. 10 illustrates a program and the "Focus View" button 1020 has been activated. In this exemplary user interface, a user may first enter a program mode (e.g., input program mode or output program mode) by activating the "Focus View" symbol 1020, activates either an input 1006 for an input program mode or an output 1010 for an output program mode. For example, if the user activates the "Focus View" 1020 and select "Input 1" 1006, the central graphical display portion with present an input program mode in which the correspond graphical symbol 1012 for "Input 1" may be graphically represented with some emphasis or distinction to differentiate 1012 from the remaining inputs 1002.

The exemplary interface may also display the active, current connection 1014 for the graphical representation of "Input 1" 1012 with some emphasis or distinction from the overlaid "all possible connections" in this example. The corresponding output (only the graphical representation 1008 in this example) may also be represented with some emphasis or distinction to distinguish 1008 from the remaining outputs 1004. In this example, the graphical cross control interface may provide one or more macroscopic controls (e.g., 1016) and/or a microscopic control (e.g., 1018) for gain or attenuation of any particular connection, input, or output. It shall be noted that the bottom region including the graphical symbols 1006 and 1008 or the region including the attenuation/gain controls (1016 and 1018) may not necessarily be arranged in the same or substantially similar manners as shown in FIG. 10. Rather, these portions may be arranged in any reasonable manners. In some embodiments where the portion accommodating the graphical symbols for input or output identification does not have sufficient area to accommodate all of the input and output graphical symbols at once, a sliding screen may be provided for this portion of the interface.

Figure 11:
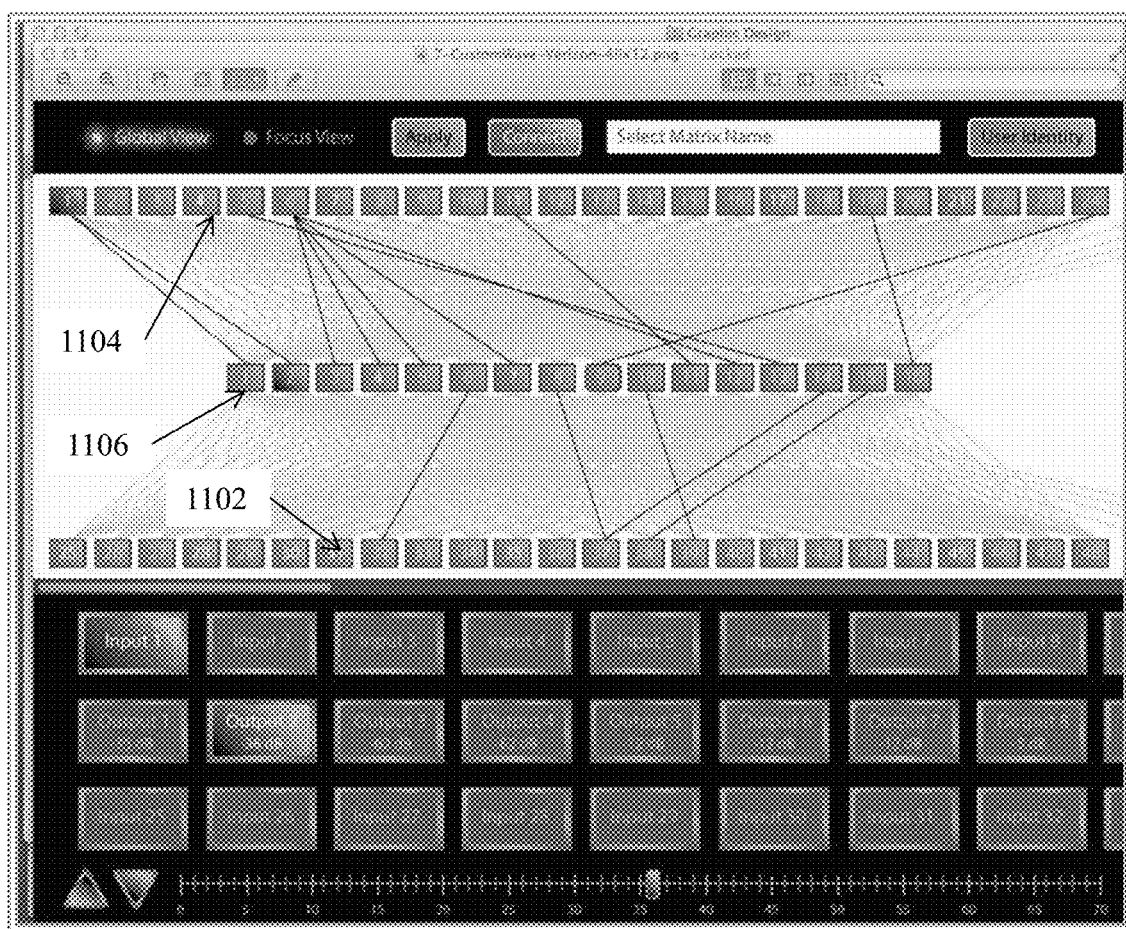
FIG. 11 illustrates an exemplary user interface for providing graphical cross connectivity and dynamic configurability for interconnection between multiple inputs and multiple outputs in some embodiments.

FIG. 11 illustrates an exemplary user interface for providing graphical cross connectivity and dynamic configurability for a switch matrix in some embodiments. More specifically, FIG. 11 illustrates an exemplary arrangement of one row of input graphical representation symbols 1106 sandwiched between two rows of output graphical representation symbols with the first row 1102 below and the second row 1104 above the row of input symbols 1106.

Figure 12:
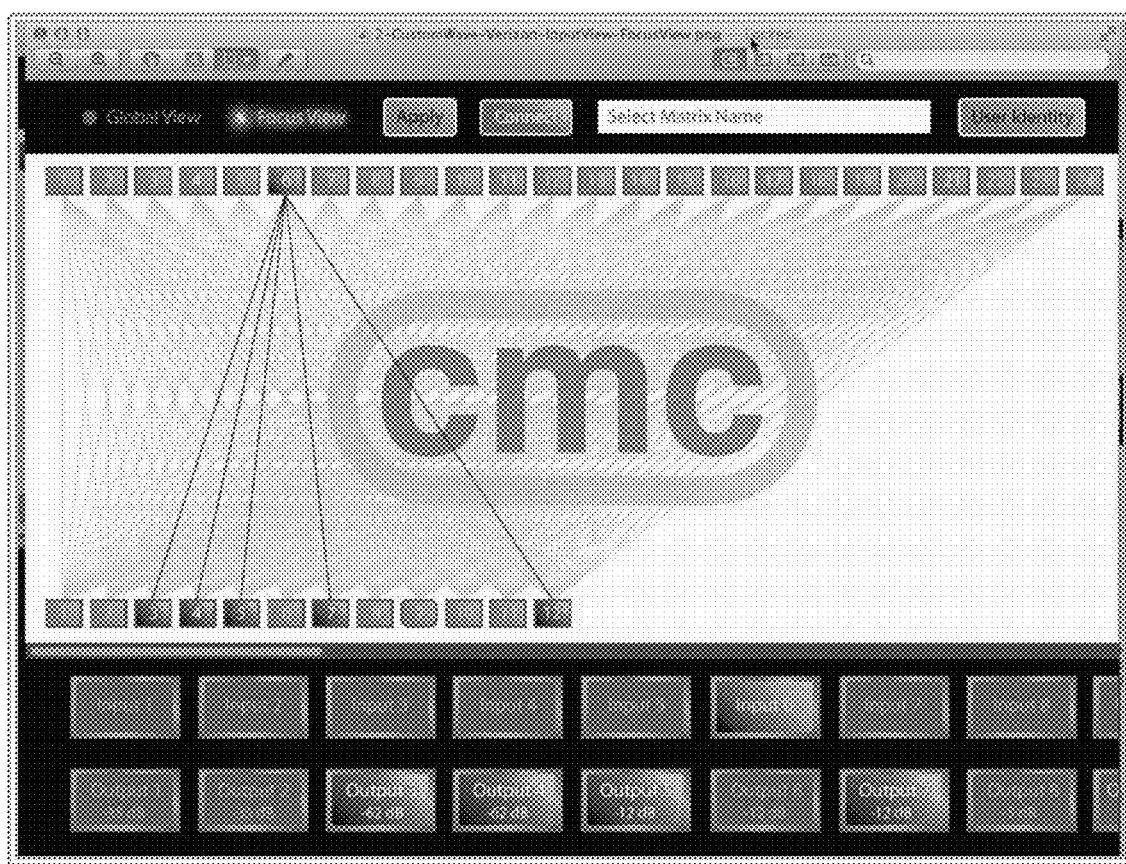
FIG. 12 illustrates an exemplary user interface for providing graphical cross connectivity and dynamic configurability for interconnection between multiple inputs and multiple outputs in some embodiments.

FIG. 12 illustrates an exemplary user interface for providing graphical cross connectivity and dynamic configurability for a switch matrix in some embodiments. More specifically, FIG. 12 illustrates a similar represented a Web-based interface with the attenuation or gain controls omitted that may be used to perform identical or substantially similar functions.

FIG. 13 illustrates a part of an exemplary user interface for providing graphical cross connectivity and dynamic configurability for a switch matrix in some embodiments. More specifically, FIG. 13 shows the emphasis on active, current connections 1304 as compared to the possible connections 1302 between multiple inputs and multiple outputs.

Figure 14:
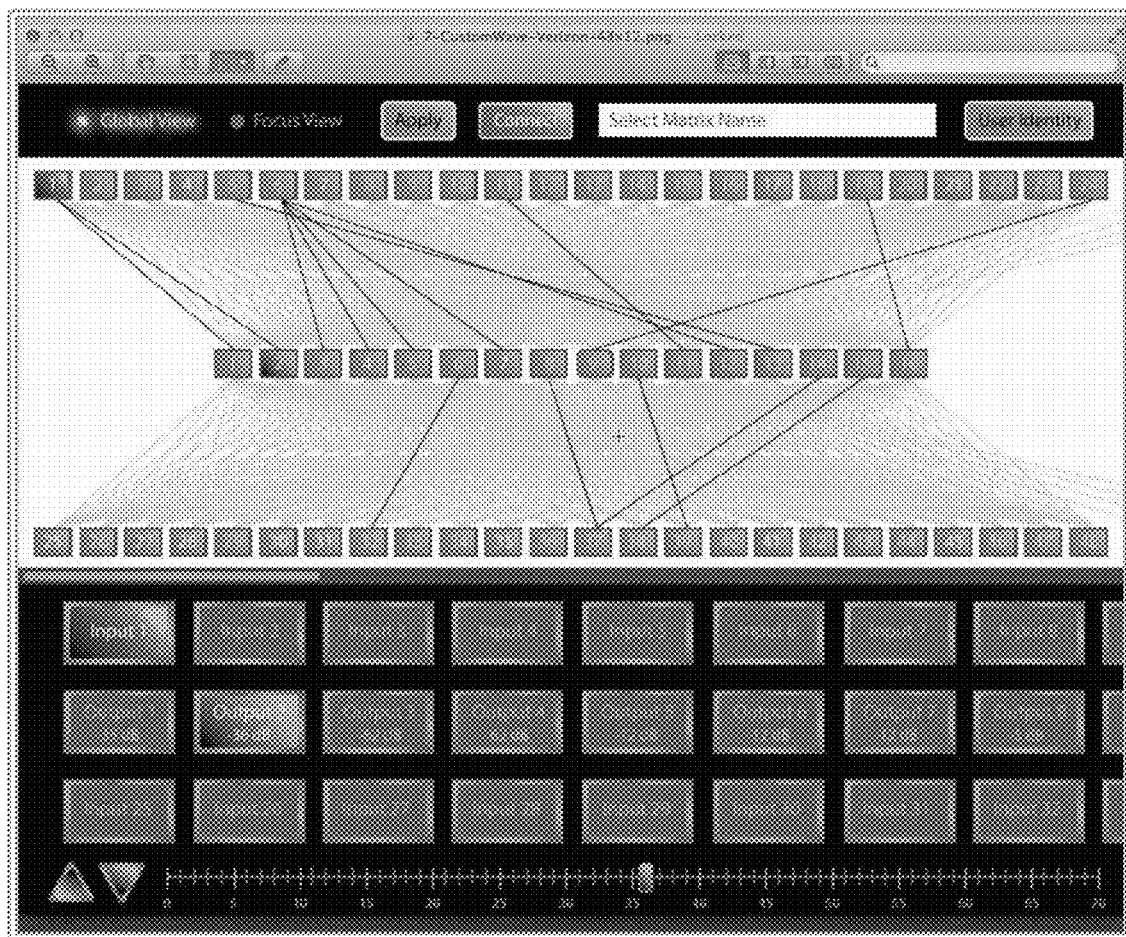
FIG. 14 illustrates an exemplary user interface for providing graphical cross connectivity and dynamic configurability for interconnection between multiple inputs and multiple outputs in some embodiments.

FIG. 14 illustrates an exemplary user interface for providing graphical cross connectivity and dynamic configurability for a switch matrix in some embodiments. More specifically, FIG. 12 illustrates a similar represented a Web-based interface together with the attenuation or gain controls that may be used to perform identical or substantially similar functions.

System Architecture Overview

Figure 15:
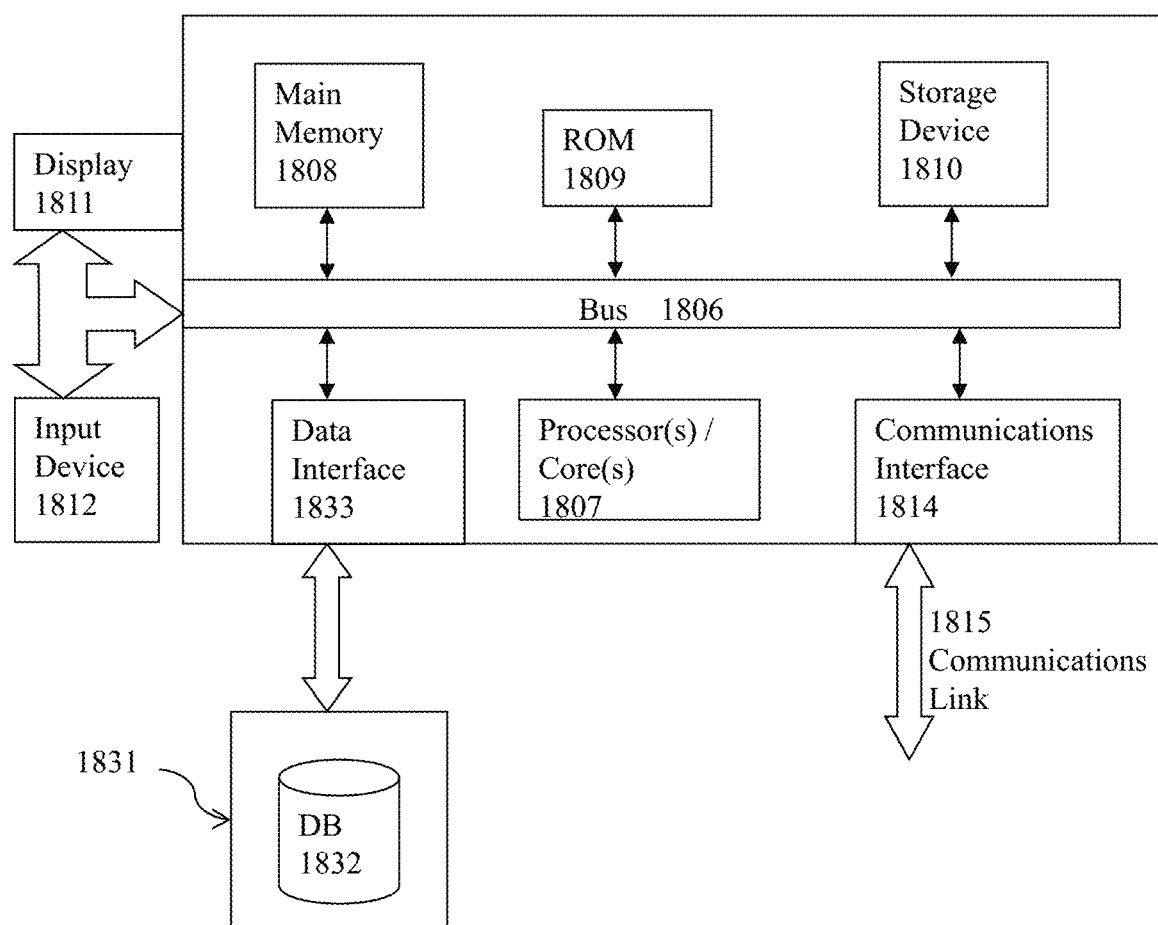
FIG. 15 illustrates a block diagram of an illustrative computing system suitable for implementing various embodiments described here.

FIG. 15 illustrates a block diagram of an illustrative computing system 1800 suitable for implementing various embodiment of the invention. For example, the exemplary computing system 1800 may be used to implement various processes as described in the preceding paragraphs and the figures such as various processes or modules of determining whether the first post is of interest, various analysis processes or modules, various other determining processes or modules, various processes or modules for performing various actions, etc. as described in the remainder of the Application. Computer system 1800 includes a bus 1806 or other communication mechanism for communicating information, which interconnects subsystems and devices, such as processor 1807, system memory 1808 (e.g., RAM), static storage device 1809 (e.g., ROM), disk drive 1810 (e.g., magnetic or optical), communication interface 1814 (e.g., modem or Ethernet card), display 1811 (e.g., CRT or LCD), input device 1812 (e.g., keyboard), and cursor control (not shown).

According to one embodiment of the invention, computer system 1800 performs specific operations by one or more processors or processor cores 1807 executing one or more sequences of one or more instructions contained in system memory 1808. Such instructions may be read into system memory 1808 from another computer readable/usable storage medium, such as static storage device 1809 or disk drive 1810. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention. In the single embodiment or in some embodiments, the one or more processors or processor cores 1807 may be used to perform various actions such as various actions, processes, or modules involving determining, analyzing, performing actions, etc. In some embodiments, at least one of the one or more processors or processor cores 1807 has the multithreading capability.

In one embodiment, the term "logic" shall mean any combination of software or hardware that is used to implement all or part of the invention. In the single embodiment or in some embodiments, the one or more processors or processor cores 1807 may be used to perform various acts such as various acts involving determining, analyzing, performing actions, etc. In some embodiments, at least one of the one or more processors or processor cores 1807 has the multithreading capability to execute a plurality of threads to perform various tasks as described in the preceding sections.

Various actions as described in the preceding paragraphs may be performed by using one or more processors, one or more processor cores, or combination thereof 1807. For example, various processes or modules involving the determining action, various analysis processes or modules, etc. may be performed by one or more processors, one or more processor cores, or combination thereof.

The term "computer readable storage medium" or "computer usable storage medium" as used herein refers to any non-transitory medium that participates in providing instructions to processor 1807 for execution. Such a medium may take many forms, including but not limited to, non-volatile media and volatile media. Non-volatile media includes, for example, optical or magnetic disks, such as disk drive 1810. Volatile media includes dynamic memory, such as system memory 1808.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In an embodiment of the invention, execution of the sequences of instructions to practice the invention is performed by a single computer system 1800. According to other embodiments of the invention, two or more computer systems 1800 coupled by communication link 1815 (e.g., LAN, PTSN, or wireless network) may perform the sequence of instructions required to practice the invention in coordination with one another.

Computer system 1800 may transmit and receive messages, data, and instructions, including program, i.e., application code, through communication link 1815 and communication interface 1814. Received program code may be executed by processor 1807 as it is received, and/or stored in disk drive 1810, or other non-volatile storage for later execution. In an embodiment, the computer system 1800 operates in conjunction with a data storage system 1861, e.g., a data storage system 1861 that contains a database 1862 that is readily accessible by the computer system 1800. The computer system 1800 communicates with the data storage system 1861 through a data interface 1866. A data interface 1866, which is coupled to the bus 1806, transmits and receives electrical, electromagnetic or optical signals that include data streams representing various types of signal information, e.g., instructions, messages and data. In embodiments of the invention, the functions of the data interface 1866 may be performed by the communication interface 1814.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method, comprising:
   identifying multiple inputs and multiple outputs in a network of connected devices under test for characterizing the connected devices or signal broadcasting therefrom with a switch matrix, wherein the multiple inputs and the multiple outputs are connected to the switch matrix;
   representing the multiple inputs as a first linear arrangement along a first direction and the multiple outputs as a second linear arrangement along the first direction on a graphical cross connectivity interface of the switch matrix, wherein
   the first linear arrangement is opposing the second linear arrangement, and the first linear arrangement and the second linear arrangement are configured to sandwich at least one region for displaying connectivity information between the multiple inputs and the multiple outputs; and
   determining a plurality of connections between the multiple inputs and the multiple outputs at least by:
   generating a graphical representation for the connectivity information at least by representing the connectivity information received from a server in the at least one region of the graphical cross connectivity interface with one or more lines or shapes that interconnect one or more pairs of inputs and outputs of the multiple inputs and the multiple outputs at least by querying the switch matrix, wherein the graphical cross connectivity interface displays no graphical line or shape between a first input of the multiple inputs and a first output of the multiple outputs to indicate no practically possible connections between the first input and the first output, and the graphical representation includes include a global view comprising all of practically possible connections that are located between the multiple inputs and the multiple outputs and are de-emphasized with a different line or shape graphically representing an active, current connection and having a different color, type, or thickness than lines or shapes graphically representing all of the practically possible connections in the graphical cross connectivity interface.

2. The computer implemented method of claim 1, further comprising:

identifying one or more instructions from the graphical cross connectivity interface to configure interconnections between the multiple inputs and the multiple outputs; and transmitting the one or more instructions to the server that is connected to the switch matrix, wherein the one or more instructions are used to invoke a connectivity configuration process on the server in response to the one or more instructions.

3. The computer implemented method of claim 2, further comprising:

receiving the connectivity information from the server that is located remotely from the switch matrix in response to a connectivity configuration request transmitted from the switch matrix to the server, wherein the connectivity configuration request is to configure connectivity between the multiple inputs and the multiple outputs.

4. The computer implemented method of claim 3, further comprising:

identifying or configuring, at the server on which the connectivity configuration process resides, the connectivity information between the multiple inputs and the multiple outputs of the switch matrix in response to the one or more instructions.

5. The computer implemented method of claim 1, wherein the graphical cross connectivity interface of the switch matrix comprises a graphical control element, and the computer implemented method further comprising adjusting attenuation or gain of a first input of the multiple inputs, a first output of the multiple outputs with the graphical control element, or a connection between the first input and the first output.

6. The computer implemented method of claim 1, wherein the graphical cross connectivity interface comprises a first graphical icon to turn off the global view in the graphical cross connectivity interface and a plurality of second graphical icons representing the multiple inputs or the multiple outputs, and a second graphical icon of the plurality of second graphical icons, when activated, causes an execution of an instruction that graphically emphasizes one or more connections to and from a first input or a first output corresponding to the graphical icon.

7. The computer implemented method of claim 1, further comprising:

presenting display contents corresponding to multiple view modes in the graphical cross connectivity interface;

overlaying an input program display mode content that includes first information about one or more current, active connections between an input and at least one of the multiple outputs with a global view display mode content that includes second information about all of the practically possible connections, wherein absence of a possible connection between a first input and a first output indicates a connection between the first input and the first output is not possible; and representing the input with first emphasis or first distinction from one or more remaining inputs of the multiple inputs.

8. The computer implemented method of claim 7, wherein the multiple view modes include a global view mode, an input program mode, an output program mode, an input focus view mode, or an output focus view mode.

9. The computer implemented method of claim 1, the act of representing the connectivity information on the graphical cross connectivity interface comprising at least one of:

displaying at least one current, active connection between an input of the multiple inputs and at least one of the multiple outputs in the graphical cross connect interface;

displaying at least one current, active connection between an output of the multiple outputs and at least one of the multiple inputs in the graphical cross connect interface;

displaying all of the practically possible connections in the graphical cross connect interface, wherein absence of a possible connection between a first input and a first output indicates a connection between the first input and the first output is not possible; or displaying all current, active connections between the multiple outputs and corresponding outputs of the multiple inputs in the graphical cross connect interface.

10. The computer implemented method of claim 9, further comprising:

querying the switch matrix or a data structure related to the switch matrix to determine the connectivity information between a first input and one or more outputs currently connected to the input;

configuring or reconfiguring an on-screen display of the connectivity information to emphasize the connectivity information corresponding to the input and the one or more outputs that are currently connected to the input with first emphasis or first distinction; and representing the one or more outputs with second emphasis or second distinction from one or more remaining outputs of the multiple outputs.

11. An article of manufacture comprising a non-transitory computer readable storage medium storing thereupon a sequence of instructions which, when executed by at least one processor or at least one processor core, causes the at least one processor or the at least one processor core to perform a set of acts, the set of acts comprising:

identifying multiple inputs and multiple outputs in a network of connected devices under test for characterizing the connected devices or signal broadcasting therefrom with a switch matrix, wherein the multiple inputs and the multiple outputs are connected to the switch matrix;

representing the multiple inputs as a first linear arrangement along a first direction and the multiple outputs as a second linear arrangement along the first direction on a graphical cross connectivity interface of the switch matrix, wherein the first linear arrangement is opposing the second linear arrangement, and the first linear arrangement and the second linear arrangement are configured to sandwich at least one region for displaying connectivity between the multiple inputs and the multiple outputs; and determining a plurality of connections between the multiple inputs and the multiple outputs at least by:

generating a graphical representation for the connectivity information at least by representing connectivity information received from a server on the graphical cross connectivity interface with at least one or more lines or shapes that interconnect one or more pairs of inputs and outputs of the multiple inputs and the multiple outputs at least by querying the switch matrix, wherein the graphical cross connectivity interface displays no line or shape between a first input of the multiple inputs and a first output of the multiple outputs to indicate no practically possible connections between the first input and the first output, and the graphical representation includes include a global view comprising all of practically possible connections that are located between the multiple inputs and the multiple outputs and are de-emphasized with a different line or shape graphically representing an active, current connection and having a different color, type, or thickness all of the practically possible connections in the graphical cross connectivity interface.

12. The article of manufacture of claim 11, the act of acts further comprising:

identifying one or more instructions from the graphical cross connectivity interface to configure interconnections between the multiple inputs and the multiple outputs; and transmitting the one or more instructions to the server that is connected to the switch matrix, wherein the one or more instructions are used to invoke a connectivity configuration process on the server in response to the one or more instructions.

13. The article of manufacture of claim 12, the set of acts further comprising:

receiving the connectivity information from the server that is located remotely from the switch matrix in response to a connectivity configuration request transmitted from the switch matrix to the server, wherein the connectivity configuration request is to configure connectivity between the multiple inputs and the multiple outputs; and identifying or configuring, at the server on which the connectivity configuration process resides, the connectivity information between the multiple inputs and the multiple outputs of the switch matrix in response to the one or more instructions.

14. The article of manufacture of claim 11, the set of acts further comprising:

presenting display contents corresponding to multiple view modes in the graphical cross connectivity interface;

overlaying an input program display mode content that includes first information about one or more current, active connections between an input and at least one of the multiple outputs with a global view display mode content that includes second information about the all of the practically possible connections, wherein absence of a possible connection between a first input and a first output indicates a connection between the first input and the first output is not possible; and representing the input with first emphasis or first distinction from one or more remaining inputs of the multiple inputs.

15. The article of manufacture of claim 11, wherein the act of representing the connectivity information on the graphical cross connectivity interface comprising at least one of:

displaying at least one current, active connection between an input of the multiple inputs and at least one of the multiple outputs in the graphical cross connect interface;

displaying at least one current, active connection between an output of the multiple outputs and at least one of the multiple inputs in the graphical cross connect interface;

displaying the all of the practically possible connections in the graphical cross connect interface, wherein absence of a possible connection between a first input and a first output indicates a connection between the first input and the first output is not possible; or displaying all current, active connections between the multiple outputs and corresponding outputs of the multiple inputs in the graphical cross connect interface; and wherein the set of acts further comprises:

querying the switch matrix or a data structure related to the switch matrix to determine the connectivity information between a first input and one or more outputs currently connected to the input;

configuring or reconfiguring an on-screen display of the connectivity information to emphasize the connectivity information corresponding to the input and the one or more outputs that are currently connected to the input with first emphasis or first distinction; and representing the one or more outputs with second emphasis or second distinction from one or more remaining outputs of the multiple outputs.

16. A system, comprising:

a computing system that comprises at least one processor or at least one processor core and a graphical cross connectivity interface, wherein the graphical cross connectivity interface is configured to:

identify multiple inputs and multiple outputs in a network of connected devices under test for characterizing the connected devices or signal broadcasting therefrom with a switch matrix, wherein the multiple inputs and the multiple outputs are connected to the switch matrix;

represent the multiple inputs as a first linear arrangement along a first direction and the multiple outputs as a second linear arrangement along the first direction on the graphical cross connectivity interface of the switch matrix, wherein the first linear arrangement is opposing the second linear arrangement, and the first linear arrangement and the second linear arrangement are configured to sandwich at least one region for displaying connectivity information between the multiple inputs and the multiple outputs; and generate a graphical representation for the connectivity information at least by representing the connectivity information received from a server on the graphical cross connectivity interface with at least one or more lines or shapes that interconnect one or more pairs of inputs and outputs of the multiple inputs and the multiple outputs at least by querying the switch matrix, wherein the graphical cross connectivity interface displays no line or shape between a first input of the multiple inputs and a first output of the multiple outputs to indicate no practically possible connections between the first input and the first output, and the graphical representation includes include a global view comprising all of practically possible connections that are located between the multiple inputs and the multiple outputs and are de-emphasized with a different lines or shapes graphically representing an active, current connection and having a different color, type, or thickness than lines or shapes graphically representing all of the practically possible connections in the graphical cross connectivity interface.

17. The system of claim 16, in which the graphical cross connectivity interface is further configured to:

identify one or more instructions from the graphical cross connectivity interface to configure interconnections between the multiple inputs and the multiple outputs; and transmit the one or more instructions to the server that is connected to the switch matrix, wherein the one or more instructions are used to invoke a connectivity configuration process on the server in response to the one or more instructions.

18. The system of claim 17, in which the graphical cross connectivity interface is further configured to:

receive the connectivity information from the server that is located remotely from the switch matrix in response to a connectivity configuration request transmitted from the switch matrix to the server, wherein the connectivity configuration request is to configure connectivity between the multiple inputs and the multiple outputs; and transmit one or more first instructions that cause the server on which the connectivity configuration process resides to identify or configure the connectivity information between the multiple inputs and the multiple outputs of the switch matrix in response to the one or more instructions.

19. The system of claim 16, in which the graphical cross connectivity interface is further configured to:

present display contents corresponding to multiple view modes in the graphical cross connectivity interface;

overlay an input program display mode content that includes first information about one or more current, active connections between an input and at least one of the multiple outputs with a global view display mode content that includes second information about the all of the practically possible connections, wherein absence of a possible connection between a first input and a first output indicates a connection between the first input and the first output is not possible; and represent the input with first emphasis or first distinction from one or more remaining inputs of the multiple inputs.

20. The system of claim 16, in which the graphical cross connectivity interface is further configured to:

wherein the graphical cross connectivity interface configured to represent the connectivity information on the graphical cross connectivity interface is further configured to:

display at least one current, active connection between an input of the multiple inputs and at least one of the multiple outputs in the graphical cross connectivity interface;

display at least one current, active connection between an output of the multiple outputs and at least one of the multiple inputs in the graphical cross connectivity interface;

display the all of the practically possible connections in the graphical cross connectivity interface, wherein absence of a possible connection between a first input and a first output indicates a connection between the first input and the first output is not possible; or display all current, active connections between the multiple outputs and corresponding outputs of the multiple inputs in the graphical cross connectivity interface; and wherein the graphical cross connectivity interface is further configured to:

query the switch matrix or a data structure related to the switch matrix to determine the connectivity information between a first input and one or more outputs currently connected to the input;

configure or reconfiguring an on-screen display of the connectivity information to emphasize the connectivity information corresponding to the input and the one or more outputs that are currently connected to the input with first emphasis or first distinction; and represent the one or more outputs with second emphasis or second distinction from one or more remaining outputs of the multiple outputs.

\* \* \* \* \*